No. 867,291.
PATENTED OCT. 1, 1907.
E. E. McINTYRE.
SHAFT HANGER.
APPLICATION FILED OCT. 15, 1906.
2 SHEETS—SHEET 1.
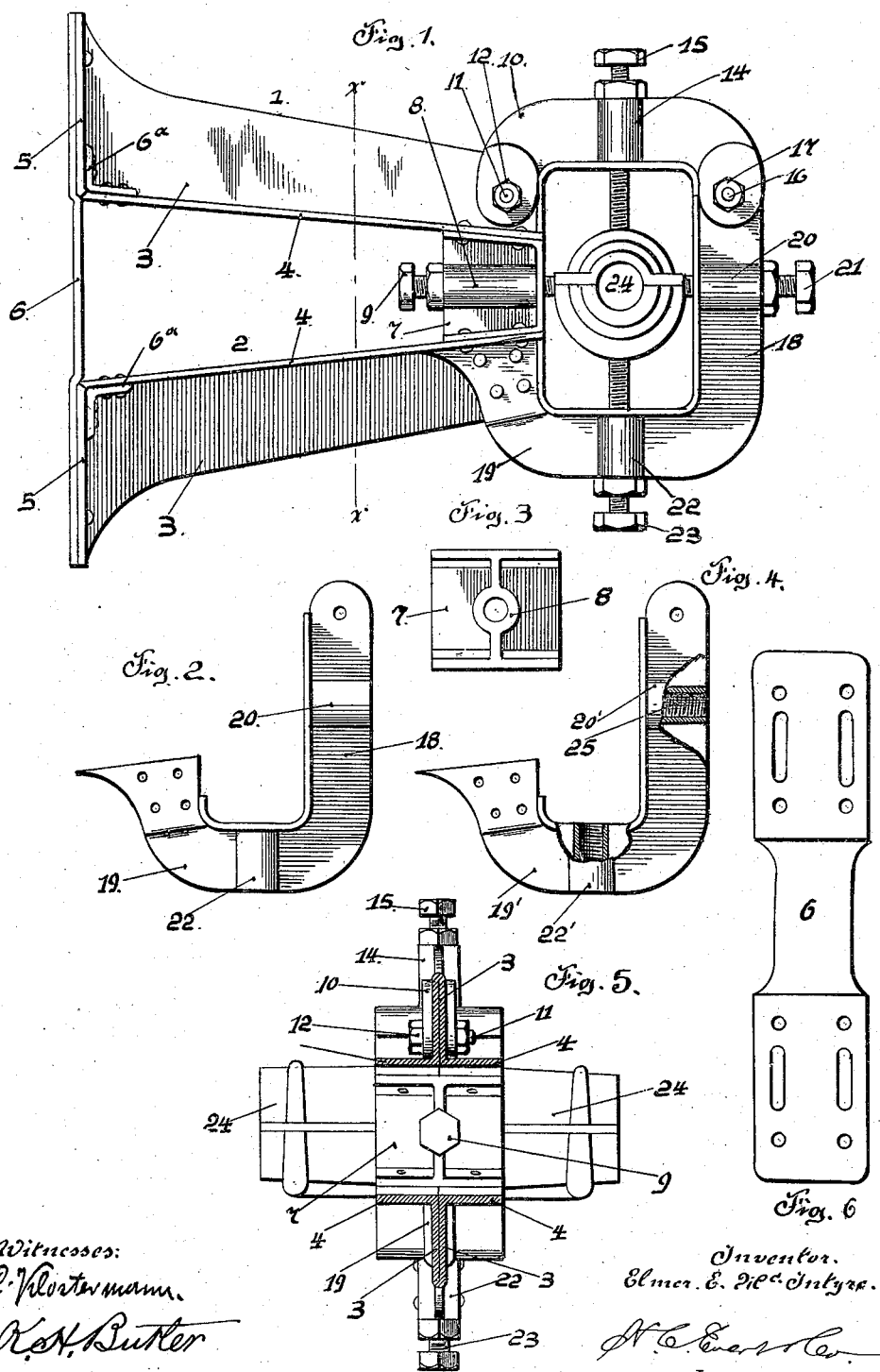

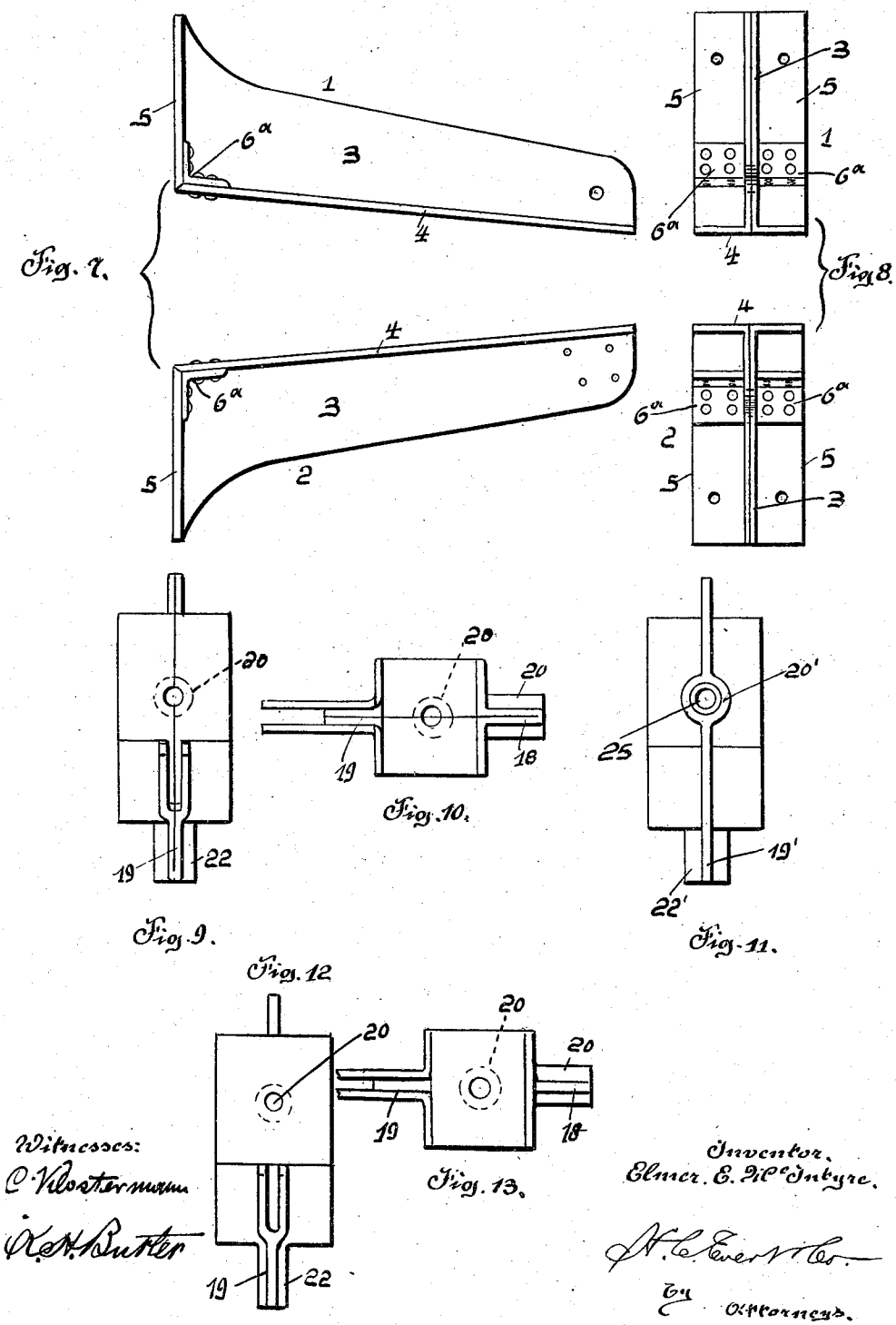

UNITED STATES PATENT OFFICE.

ELMER E. McINTYRE, OF PITTSBURG, PENNSYLVANIA.

SHAFT-HANGER.

No. 867,291.  Specification of Letters Patent.  Patented Oct. 1, 1907.

Application filed October 15, 1906. Serial No. 338,989.

*To all whom it may concern:*

Be it known that I, ELMER E. McINTYRE, a citizen of the United States of America, residing at Pittsburg, in the county of Allegheny and State of Pennsylvania, have invented certain new and useful Improvements in Shaft-Hangers, of which the following is a specification, reference being had therein to the accompanying drawing.

This invention relates to certain new and useful improvements in shaft hangers, and the primary object of the invention is to provide a hanger adapted to be secured to a wall or similar upright.

Another object of my invention is to construct my improved shaft hangers of pressed or forged steel.

The essential features of the present invention involved in the carrying out of the objects above specified (one of which presents a line of division over another application, Serial No. 283,276, and the other of which is wholly generic to the present case) are necessarily susceptible to structural change without departing from the scope of the invention; but the preferred embodiments are shown in the accompanying drawing, in which:—

Figure 1 is a side elevation of my improved hanger, Fig. 2 is an elevation of a detached forged bearing support, Fig. 3 is an end view of a detached cross head, Fig. 4 is an elevation of a modified form of bearing support, Fig. 5 is a cross sectional view of the hanger, taken on the line x—x of Fig. 1, Fig. 6 is a plan of a tie plate, Fig. 7 is a side elevation of the legs of my improved hanger, Fig. 8 is an end view of the same, Fig. 9 is an edge view of a pressed steel bearing support illustrated in Fig. 2, Fig. 10 is a plan of the same, Fig. 11 is an edge view of the modified bearing support shown in Fig. 4 of the drawings, Fig. 12 is an edge view of a forged bearing support, Fig. 13 is a plan of the same.

My improved hanger comprises two legs 1 and 2, each of which is substantially T-shaped in cross section and comprising a web 3 and oppositely projecting flanges 4. Each leg tapers and has its largest end formed with pierced flanges 5. Suitably secured to said flanges is a tie plate 6, which can be suitably secured to a wall or upright. Angle plates or cleats 6ª are secured to the flanges 5 and the oppositely projecting flanges 4 of the legs, to add stability to the same. The smaller ends of the legs 1 and 2 have their projecting flanges 4 connected by a cross head 7, said head being formed with a central boss 8 in which is mounted an adjustable screw 9.

A yoke 10 is secured to the end of the web 3 of the leg 1 by a bolt 11 and a nut 12, and said yoke is provided with a bearing 14 for a screw 15. The opposite side of the yoke is connected by a bolt 16 and a nut 17 to the vertical portion 18 of a J-shaped bearing support 19, carried by the smaller end of the leg 2. The vertical portion 18 diametrically opposite the boss 8 is provided with a horizontally disposed bearing 20, in which is adjustably mounted a screw 21. The bearing support 19 also carries a vertically disposed bearing 22, diametrically opposite the bearing 14, said bearing having an adjustable screw 23.

Supported by the screws 9, 15, 21 and 23 is a two part journal box 24, said box being described in detail in my application, above referred to.

The bearing support 19 just described and illustrated in Figs. 1 and 2 is made of forged steel, but still the same can be made of pressed steel in a manner illustrated in Figs. 4 and 11; the steel forming the bearings 20′ and 22′ of the support 19′ will be bent around interiorly threaded sleeves 25, said sleeves receiving screws similar to the bearings 20 and 22 of the forged steel support 19.

By the novel construction of my hanger, the journal box 24 can be easily and quickly adjusted with the hanger.

It is thought from the foregoing description taken in connection with the drawing, that my improved hanger will be readily understood without further description or illustration, and it is obvious that such changes in the size and minor details of construction as are permissible by the appended claims may be resorted to without departing from the spirit and scope of the invention.

What I claim and desire to secure by Letters Patent, is:—

1. A shaft hanger comprising a pair of spaced legs each embodying a web flanged at one end and having laterally-extending flanges along one edge, a tie plate binding the flanged ends of said legs together, a cross head interposed between the legs at the outer end of the latter and secured to the flanges thereof and having a bearing therein, a bearing-support having one end fixedly-secured to one of said legs at the outer end of the latter and having bearings, a yoke connected at one end to the outer end of the other leg and at its opposite end connected to the free end of said bearing-support, a bearing in said yoke, screws mounted in said several bearings, and a journal-box supported by said screws.

2. In a shaft hanger, two supporting legs each embodying a web having a flanged end and having laterally-extending flanges projecting in opposite directions from one edge of the web, a cross-head mounted between the outer ends of said legs and having lateral-flanges secured to the lateral-flanges of the legs, a substantially J-shaped bearing-support secured at one end to one of said legs, a yoke secured at one end to the other of said legs and at its opposite end secured to the free end of said bearing-support, screws adjustably-mounted in said bearing-support and cross-head and yoke, and a journal-box carried by said screws.

3. In a shaft hanger, the combination with a pair of supporting-legs, a cross-head connecting the legs together at their outer ends and having a bearing, and a yoke connected at one end to the outer end of one of the legs and having a bearing, of a bearing support of substantially J-shape secured at one end to the other of said legs and at its other end secured to said yoke, and having bearings, screws in said several bearings, and a journal-box carried by said screws.

In testimony whereof I affix my signature in the presence of two witnesses.

ELMER E. McINTYRE.

Witnesses:
MAX H. SROLOVITZ,
K. H. BUTLER.